(12) United States Patent
Pitkäranta

(10) Patent No.: US 8,220,414 B2
(45) Date of Patent: Jul. 17, 2012

(54) FEEDING APPARATUS

(75) Inventor: Jouni Pitkäranta, Seinajoki (FI)

(73) Assignee: Arkkitehtuuritoimisto Jouni Pitkaranta Oy, Seinajoki (FI)

( * ) Notice: Subject to any disclaimer, the term of this patent is extended or adjusted under 35 U.S.C. 154(b) by 341 days.

(21) Appl. No.: 12/595,706

(22) PCT Filed: Apr. 10, 2008

(86) PCT No.: PCT/FI2008/050177
§ 371 (c)(1),
(2), (4) Date: Dec. 18, 2009

(87) PCT Pub. No.: WO2008/125727
PCT Pub. Date: Oct. 23, 2008

(65) Prior Publication Data
US 2010/0116218 A1 May 13, 2010

(30) Foreign Application Priority Data

Apr. 13, 2007 (FI) .................................. 20075250

(51) Int. Cl.
*A01K 5/00* (2006.01)
(52) U.S. Cl. ...................................... 119/52.1; 119/61.3
(58) Field of Classification Search .................. 119/449, 119/52.1, 61.4, 58, 61.1, 61.3, 61.31, 521
See application file for complete search history.

(56) References Cited

U.S. PATENT DOCUMENTS
47,813 A * 5/1865 Griffin ............................ 119/58
(Continued)

FOREIGN PATENT DOCUMENTS
CH        139110        4/1930
(Continued)

OTHER PUBLICATIONS

International Search Report dated Jun. 27, 2008, from corresponding PCT application.

(Continued)

*Primary Examiner* — Yvonne Abbott
(74) *Attorney, Agent, or Firm* — Young & Thompson

(57) ABSTRACT

The invention relates to a feeding apparatus (100) used for feeding animals, such as cattle, in an animal shelter (50). The apparatus is arranged in connection with a feeding aperture (110) in the wall of the animal shelter, and it includes an air-permeating first wall (104) and an air-restricting second wall (106) together with a trough (102) for the dispensed feed. The first and second wall can be moved in front of the feeding aperture, in which case the feeding aperture is closed, and away from the feeding aperture, in which case the feeding aperture is open. A feed cover (108) has been placed onto the lower edge of the first wall in such a way that it covers part of the feed in the trough. Preferably the feed cover is a flexible structure made out of rubber, the free edge of which is equipped with an edge reinforcement (116). The first wall is fastened from its upper edge to the upper edge of the feeding aperture with hinges (112). The second wall is a sheet-like structure, which is thermally insulated and at least partially transparent, and it is fastened onto a support bar (120), which rotates around its longitudinal axis, the support bar being positioned into the upper edge of the feeding aperture. The second wall can also be a pull curtain fastened onto the first wall. A refrigeration system can be arranged in connection with the trough for preventing the feed in the trough from warming up.

20 Claims, 3 Drawing Sheets

U.S. PATENT DOCUMENTS

Figure 1A:
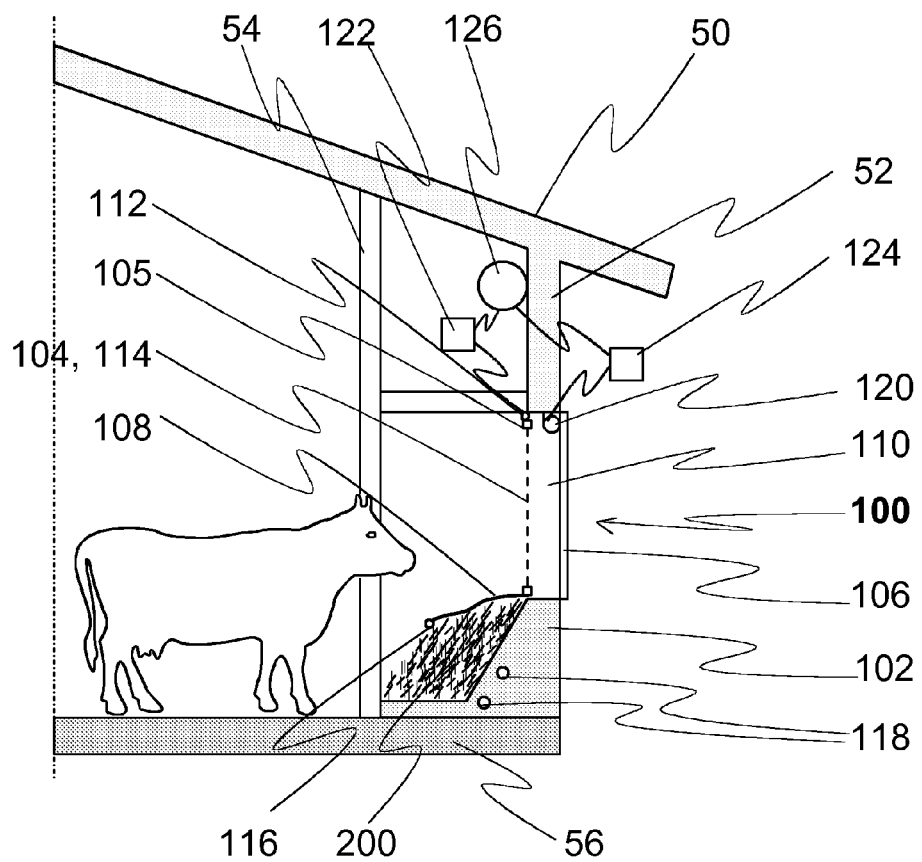

| | | | |
|---|---|---|---|
| 3,885,524 A * | 5/1975 | Gregory | 119/482 |
| 4,580,528 A * | 4/1986 | Kendall | 119/53 |
| 5,054,430 A | 10/1991 | Weelink | |
| 5,947,055 A * | 9/1999 | Cross | 119/58 |
| 6,209,489 B1 | 4/2001 | Akins | |

FOREIGN PATENT DOCUMENTS

| | | |
|---|---|---|
| CH | 186184 | 9/1936 |
| GB | 936653 | 9/1963 |
| RU | 2248122 C1 | 3/2005 |
| SU | 1837753 A3 | 8/1993 |
| WO | 01/67851 | 9/2001 |

OTHER PUBLICATIONS

Russian Office Action, dated Mar. 28, 2012, from corresponding Russian application No. 2009138878/13(055043).

* cited by examiner

FEEDING APPARATUS

The invention relates to a feeding apparatus positioned in connection with the feeding aperture of an animal shelter, in which apparatus there is an air-permeating first wall and a substantially air-restricting second wall, which first and second wall are moveable in front of the feeding aperture, in which case the feeding aperture is closed, and away from the feeding aperture, in which case the feeding aperture is open.

As the number of cattle on farms is increasing, larger amounts of coarse fodder are needed in order to feed the livestock. Therefore, farms have to an increasing extent begun using tractor-pulled feed dispenser wagons, which dispense the feed to the livestock by means of a moving belt placed transversely in the dispenser wagon.

Traditionally, the feed has been dispensed to livestock by driving a feed dispenser wagon along a feeding table inside the cattle house. The width of the dispenser wagon and a tractor, as well as animal safety concerns, have placed great demands on the width of the feeding lanes, which increases the building costs of cattle houses. Another weak point of the solution is the low level of hygiene involved as well as exhaust fumes getting inside the cattle house. For the reasons above, feeding solutions, in which the feed is dispensed to the animals from outside the cattle house, have been developed.

A feeding apparatus for feeding animals in a cattle house is known from publication WO 01/67851. In this solution, a trough for animal feed is disposed outside the cattle house's outer wall line, together with a turning mechanism protecting the trough from the weather. The livestock in the cattle house can reach the trough through the feeding aperture in the outside wall. The turning mechanism can be swung away from above the trough, and more feed can then be added to the trough from outside the cattle house, from e.g. a tractor-pulled feed dispenser wagon. The solution described in the publication is in use in several cattle houses, for instance in Finland. Within the course of product development, an bird net that can be opened has also been added, preventing the entry of birds into the cattle house when the turning mechanism is kept open for a longer period. The draw-back of this solution is its complex and heavy structure. The combined action of the bird net and the turning mechanism is dissatisfactory, and exact dispensing of the necessary amount of feed to the animals, as well as preserving the feed in a good condition, are problematic.

The object of the invention is to introduce an improved feeding apparatus, with which the drawbacks and disadvantages associated with known feeding apparatuses can be reduced.

The feeding apparatus according to the invention is characterized by what has been disclosed in the characterizing part of claim 1. Some preferred embodiments of the invention are disclosed in the dependent claims.

The object of the invention relates to a feeding apparatus for feeding animals, such as cattle, in an animal shelter. The apparatus is suitable for use in animal shelters where the feed is dispensed to the animals through a feeding aperture in the wall of the shelter. The apparatus according to the invention is arranged in connection with the feeding aperture, and it comprises an air-permeating first wall and a substantially air-restricting second wall. Preferably, it also comprises a trough, which has been arranged alongside the feeding aperture inside the shelter for the reception of the feed fed into the shelter. The first and second wall can be moved in front of the feeding aperture, in which case the feeding aperture is closed, and away from the feeding aperture, in which case the feeding aperture is open. The feeding apparatus according to the invention includes a feed cover, which has been positioned at the lower edge of the first wall, the cover being positioned in such a way that it covers part of the feed fed inside the animal shelter when the first wall has been turned in front of the feeding aperture. Preferably the feed cover is a flexible structure made out of rubber. At the free edge of the feed cover there can be an edge reinforcement such as a pipe or chain to prevent the animals from nibbling on the feed cover.

In a preferred embodiment of the invention the first wall comprises a frame substantially of the same size as the feeding aperture, together with a net fastened into the frame, the net covering the area outlined by the frame. Preferably the first wall is fastened by hinges from its upper edge close to the upper edge of the feeding aperture.

In a second preferred embodiment of the invention, the second wall is fastened onto the frame of the first wall or onto the structures outlining the feeding aperture. The second wall can be a wall-shaped structure or a curtain, preferably a pull curtain. Preferably the second wall has been built as a thermally insulating structure and is at least partially transparent.

In a third preferred embodiment of the invention, a refrigeration system has been installed in connection with the trough to prevent the feed in the trough from becoming warm. Preferably, said refrigeration system comprises of a cooling piping arranged on the wall of the trough.

In a fourth preferred embodiment of the invention a support bar rotating around its longitudinal axis has been positioned close to the upper edge of the feeding aperture, and the second wall is a panel-shaped part fastened from its upper edge to the support bar for opening and closing the second wall by way of rotating the support bar. Preferably the second wall has been constructed so as to open both inwards and outwards.

A fifth preferred embodiment of the invention further comprises a first actuator for opening and closing the first wall, and/or a second actuator for opening and closing the second wall, together with a control device in order to control the first and/or second actuator.

An advantage of the invention is that it enables the dispensing of a larger amount of feed at a time, while at the same time preserving the feed and releasing suitable rations of feed to the animals.

An advantage of the invention is that it is easy to use and reliable in year-round use and in varying weather conditions. The invention can also be used as a part of the ventilation system of the animal shelter.

A further advantage of the invention is that it is a simple structure and its building costs are low.

The invention is described in detail below. Reference is made to the accompanying drawings in which FIGS. 1*a*-1*c* illustrate, by way of example, a feeding apparatus according to the invention as a section view.

Figures 2A, 2B:
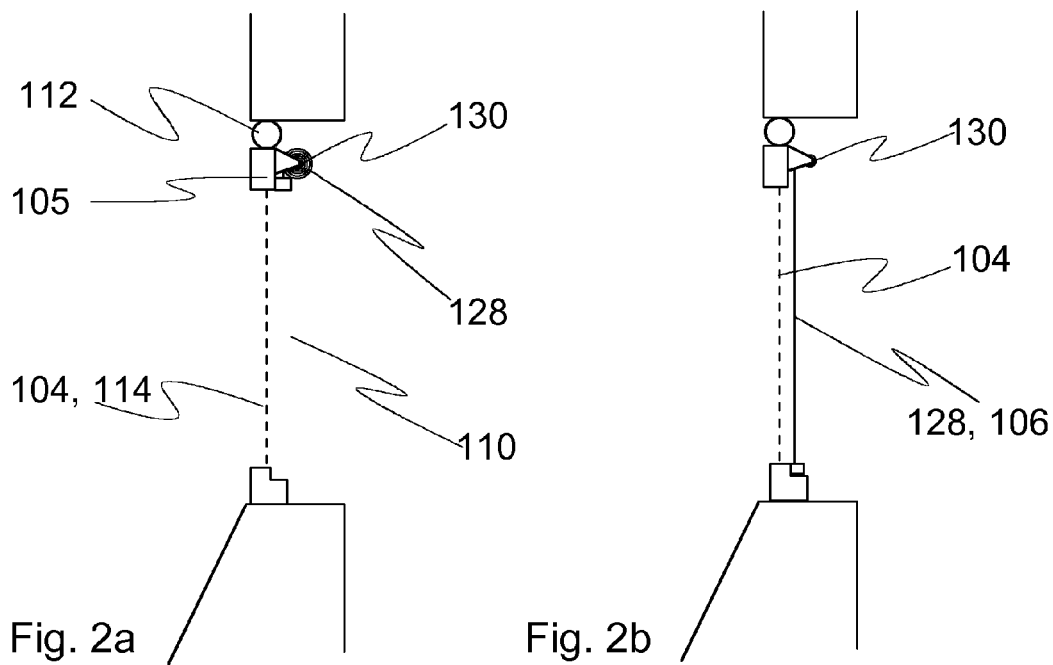
Figure 3A:
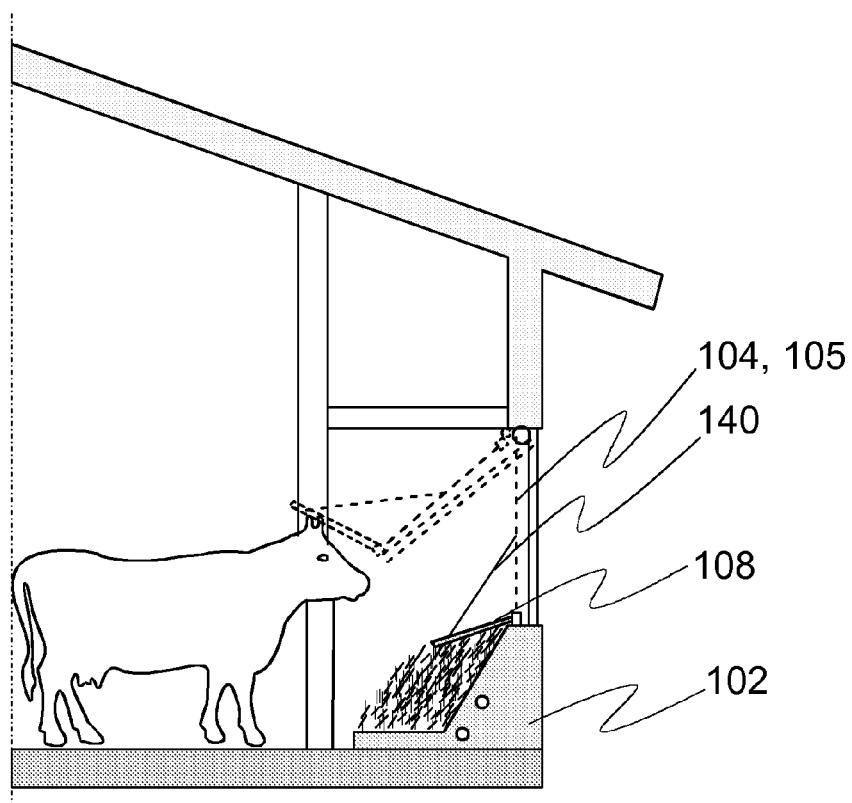
Figure 3B:
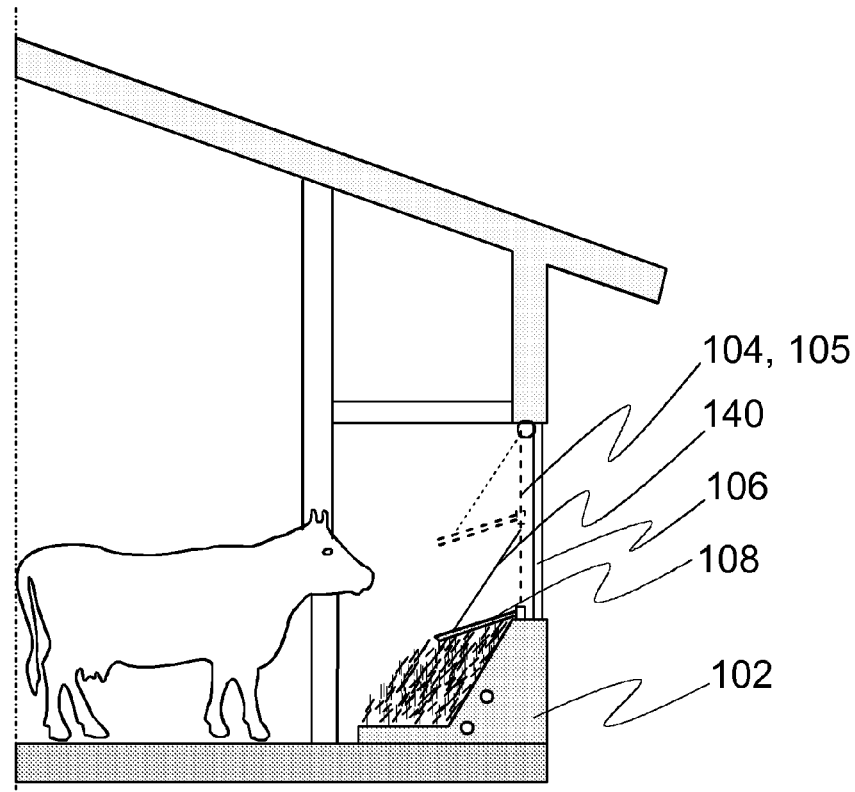

FIGS. 2*a*-2*b* illustrate, by way of example, a partially enlarged view of a preferred embodiment of the feeding apparatus according to the invention as a section view, and FIGS. 3*a*-3*b* illustrate, by way of example, some preferred embodiments of the feeding apparatus according to the invention as a section view.

Figure 1B:
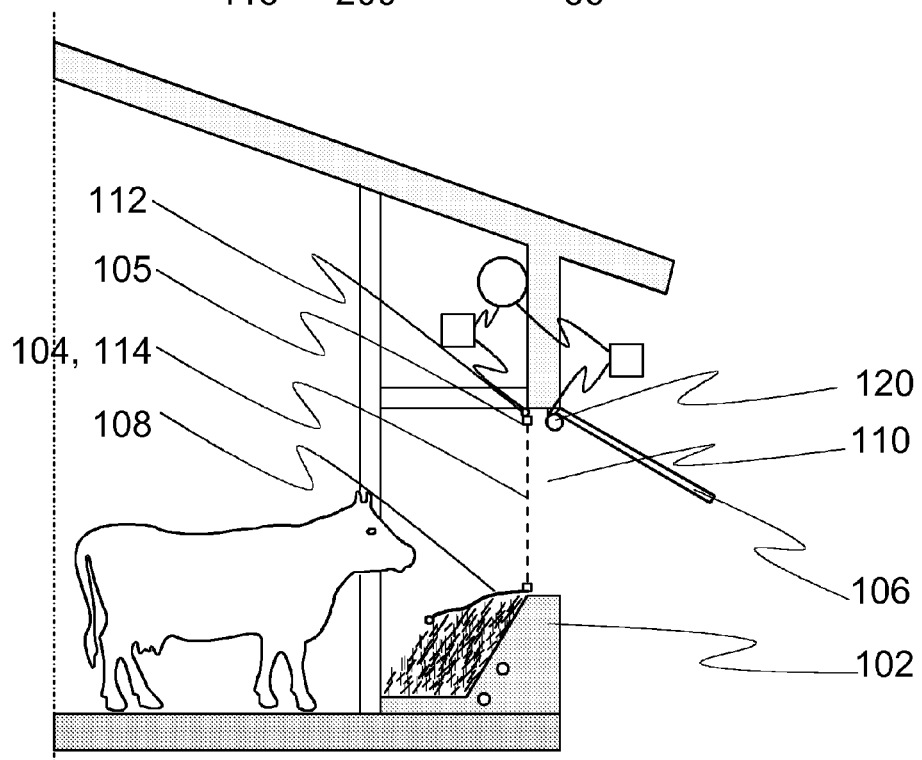
Figure 1C:
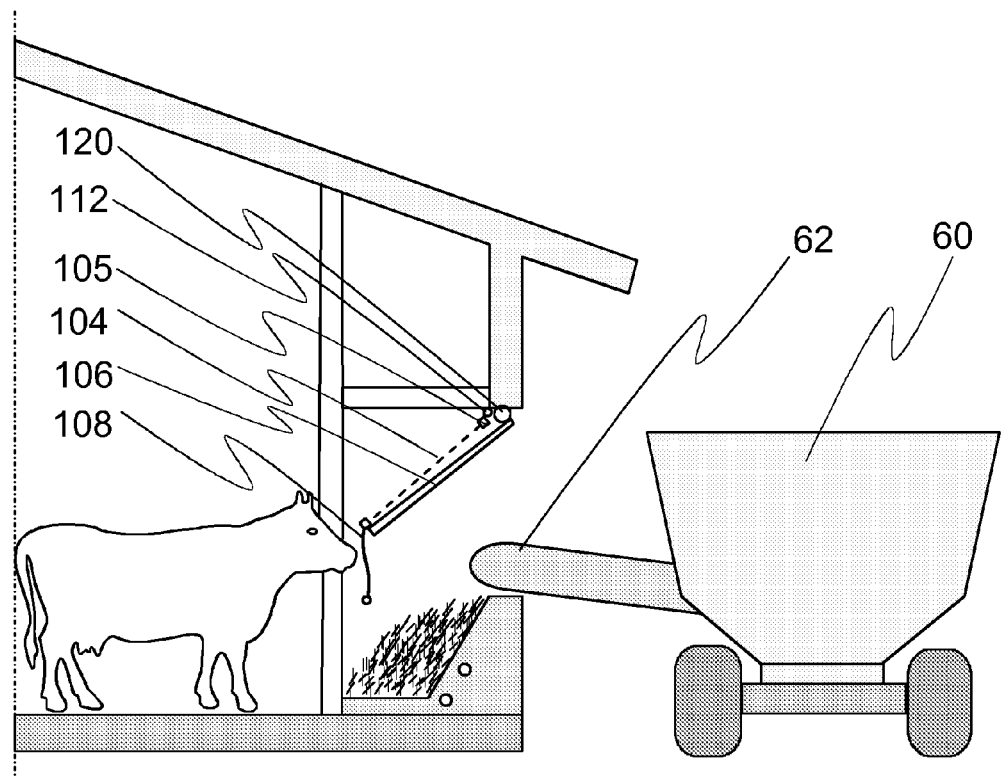

FIGS. 1*a*-1*c* illustrate, by way of example, a feeding apparatus 100 according to the invention as a section view. The feeding apparatus comprises a trough 102 for animal feed, placed inside the animal shelter 50 along its outer wall line 52. The outer wall line comprises a feeding aperture 110, through which the feed for feeding animals can be transferred from the feed dispenser wagon 60 outside the animal shelter into the trough using a conveyor belt 62 (FIG. 1*c*). The outer wall can be a supporting wall structure of the animal shelter, or it can be a non-supporting façade, in which case the actual supporting structure comprises pillars 54 inside of the animal shelter. The trough 102 can be of any suitable material, such as concrete, wood, plastic material, fibreglass, or of a composite material. The trough can be placed directly onto the floor structure 56 of the animal shelter, or a separate support structure can be built for it. In this invention, the trough refers in general to a space or area inside the animal shelter into which the feed for the animals is dispensed, and where the animals can reach it. Thus, the trough need not be of a trough-like shape, and it does not necessarily need to be a separate structure. For example, the trough can be constructed as an integral part of the wall and/or floor structures of the animal shelter.

A refrigeration system can be positioned in the trough to prevent the feed from becoming excessively warm. Preferably, such a refrigeration system comprises cooling pipes 118 arranged inside the wall of the trough, and a refrigeration system (not shown in the FIGS.) connected to the cooling pipes, used for cooling and circulating the liquid in the cooling pipes.

Two walls have been placed in connection with the feeding aperture 110, the first wall 104 and the second wall 106. The walls can be moved in front of the feeding aperture, in which case they close the feeding aperture, or away from the feeding aperture, in which case the feeding aperture is open. The first wall is an air-permeating structure comprising of a frame 105 forming the outer edge of the wall, and of a net 114 fastened onto the frame. The net is fastened onto the frame in such a way that it covers substantially the entire area outlined by the frame. The frame 105 is fastened from its upper edge by hinges 112 to the upper edge of the feeding aperture 110. Fastening by hinges has been realized in such a way that frame 105 can be turned inwards from the feeding aperture (FIG. 1c), in which case the first wall opens.

A feed cover 108 has been fastened onto the lower edge of the frame. The feed cover can be a flexible carpet-like structure or a stiff, wall-shaped structure. Preferably the feed cover is made out of a flexible material such as rubber. The feed cover is fastened onto the lower edge of the frame in such a way that it rests on top of the feed in the trough 102, when the first wall is in a closed position as depicted in FIGS. 1a and 1b. The first wall can also be realized without a stiff frame, in which case the net 114 is fastened from its upper edge to hang freely, and the feed cover is fastened directly onto the lower edge of the net. The feed cover prevents the air inside the animal shelter from mixing with the feed, and slows down the warming up of cool feed. Thanks to the feed cover, the feed stays edible for a longer time. The feed cover preserves the feed even better when the trough is equipped with the cooling equipment mentioned above. The width of the feed cover is dimensioned such that it covers only the upper edge of the feed in the trough. Thus, the animals in the animal shelter can eat the part of the feed in the trough, which is not covered by the feed cover. Because the feed cover can be used to regulate the amount of feed available to the animals, larger amounts of feed can be dispensed into the trough at a time. Feed in the trough can be dispensed to the animals in adequate portions by turning the first wall inwards and back, leading to the feed falling off from under the feed cover and into the reach of the animals. Preferably, a first actuator 122 and a control device 126 for controlling the actuator have been arranged in connection with the first wall. These devices make it possible to turn the first wall automatically. The control device can be for instance a timer switch. The detached edge of the feed cover is equipped with edge reinforcement 116, the main function of which is to prevent animals from nibbling on the edge of the feed cover. Preferably the edge reinforcement is a pipe or chain fastened to the edge of the feed cover.

Located at the upper edge and parallel with the upper edge of the feeding aperture is a support bar 120, the length of which is substantially the same as the width of the feeding aperture. The support bar is fastened in place using pivoted support structures (not shown in the FIGS.) in such a way that the support bar can be rotated around its longitudinal axis. The second wall 106, which is a stiff panel-shape structure, has been fastened onto this support bar from its upper edge. This way the second wall can be opened and closed by rotating the support bar. In order to open and close the wall, a second actuator 124 has been placed in connection with the other end of the support bar, the actuator being controlled with the control device 126.

When the second wall is in the closed position, as depicted in FIG. 1a, it covers substantially the entire feeding aperture and thus forms a weather- and wind-resistant cover in front of the feeding aperture. It is also possible to construct the second wall as a thermally insulating structure, which is especially advantageous in cold climates. Preferably the second wall is at least partially made of a transparent material, such as a polycarbonate panel.

The pivoted fastening of the support bar 120 and the fastening of the second wall 106 to the support bar have been realized in such a way that the second wall can be set by rotating the support bar into a closed position (FIG. 1a), into a position opened outwards (FIG. 1b), into a position opened inwards (FIG. 1c), or into any position in between the above-mentioned positions. The closed position depicted in FIG. 1a is suitable as the main position for using the walls, for instance in the winter when the feed aperture must be closed to keep the animal shelter warmer than the outside air. The position opening outwards, depicted in FIG. 1b, is a suitable position in the summer, for example. When the second wall is opened, air is free to flow through the feeding aperture, the animal shelter becomes well ventilated and the temperature inside does not rise too high. The second wall opened outwards in a slanting position forms a roof over the feeding aperture, which prevents diagonally falling rain from entering the animal shelter. In the position depicted in FIG. 1b, the first wall is in the closed position. However, this does not prevent air from flowing through, since the first wall is an air-permeating wall, being preferably of a net-like structure. However, the first wall prevents small animals and birds from entering the animal shelter via the feeding aperture, and thus ensures, among other things, a good level of hygiene in the animal shelter.

In FIG. 1c, the second wall 106 is in a position opening inwards. The second wall is turned into this position by rotating the support bar 120, when the aim is to add feed to the trough from outside the animal shelter. When opening inwards, the second wall 106 pushes the first wall in front of it, which opens inwards, into an open position. At the same time, feed cover 108, which is fastened onto the edge of the first wall, rises away off of the trough 102 and the feed 200 possibly still in the trough. When the walls are in this position, the feed dispenser wagon 60 can be used to dispense feed into the trough 102 using a conveyor belt 62. After the feed has been dispensed, the first and second wall are returned to a proper position, which is the position according to FIG. 1a or FIG. 1b, depending on the weather conditions.

The height of the first and second wall is substantially the same as the height of the feeding aperture. The width of the walls can be chosen appropriately according to the size of the feeding aperture. In the event the width of the feeding aperture is fairly small, preferably less than 2 metres, the frame can be constructed to measure the same width as the width of the feeding aperture. However, often the feeding aperture is clearly wider than the measurement in question, sometimes even substantially of the same length as the entire façade. In such a case, several first and second walls are installed side by side for covering the feeding aperture, whereby the width of walls can be chosen according to, for instance, architectural or production technological matters.

FIGS. 2a and 2b illustrate, by way of example, a partially enlarged section view of the feeding apparatus according to the invention. FIGS. 2a and 2b illustrate feeding aperture 110 of the feeding apparatus together with the first and second walls connected to it. In this embodiment the first wall 104 is substantially the same as has been described above, meaning that it comprises of the frame 105 and the net 114 fastened onto the frame. The first wall is fastened onto the upper edge of the feeding aperture by way of hinges 112. A preferred embodiment of the invention shown in the FIGS. differs from the invention described above substantially in relation to the structure of the second wall. In this embodiment the second wall 106 is a felt-like curtain 128, which has been fastened from one of its edges onto an axle 130 that is arranged onto the upper edge of the frame, the axle being pivoted at its ends in order to rotate it around its longitudinal axle. By rotating the axle in the first direction the felt turns away from around the axle. In the completely out-turned position, the curtain 128 covers substantially the whole area outlined by the frame (FIG. 2b). Correspondingly, by rotating the axle in the second direction the felt again turns around the axle and away from the area outlined by the frame (FIG. 2a). In this way, the axle 130 and curtain 128 act together in the same way as a pull curtain. This preferred embodiment of the invention is structurally lighter than the above described feeding apparatus with a panel-like second wall and it is especially suited for warm climates where the second wall need not be thermally insulated.

FIG. 3a illustrates, by way of example, a preferred embodiment of the feeding apparatus according to the invention as a section view. The first wall 104 comprises a frame 105 and a net fastened onto the frame. The feed cover 108 fastened onto the first wall is a substantially stiff wall, which keeps its shape and which is fastened onto the lower edge of the frame and placed into a slanting position with support wire 140. When the first wall is closed, the feed cover partially covers the feed in the trough 102. The position of the feed cover is shown using a continuous line. When the first wall is open for adding more feed, the feed cover rises together with the first wall away from the feed. This position of the feed cover is shown using a broken line.

FIG. 3b illustrates, by way of example, a second preferred embodiment of the feeding apparatus according to the invention as a section view. In this embodiment the second wall 106 is a solid panel-like part, which is fastened with hinges to the upper edge of the feeding aperture, and the first wall 104 is a curtain, which can be rolled up and is fastened onto an axle, rotatable around its longitudinal axis and assembled onto the upper edge of the feeding aperture. The panel-like feed cover is fastened onto the lower edge of the first wall into a slanting position as in FIG. 3b. The other side of the first wall, opposite the feed cover, must naturally be equipped with a counterweight (not shown in the FIGS.) in order to prevent the curtain-like feed cover from twisting as a result of the weight of the feed cover. When the first wall is in the down position, the feed cover sets above the feed in the trough (continuous line). Correspondingly, when the first wall is lifted up, the feed cover rises upwards together with the wall away from the feed. The rising and lowering of the feed cover can be automated if needed, using an actuator and a control device (not shown in the FIGS.).

The preferred embodiment of the invention as shown in FIG. 3b can also be applied to indoor feeding tables in the animal shelter, in which case the second wall is not needed as protection against weather.

The feeding apparatus described above is particularly well suited for feeding cattle, but it can also be used to feed other kinds of livestock or domestic animals kept in an animal shelter.

Some of the preferred embodiments of a feeding apparatus according to the invention have been described above. The invention is not limited to the solutions described above, but the inventive idea can be applied in numerous ways within the scope defined by the claims.

The invention claimed is:

1. A feeding apparatus (100) to be arranged in connection with the feeding aperture (110) of an animal shelter (50), in which apparatus there is an air-permeating first wall (104) and a substantially air-restricting second wall (106), which first and second wall are moveable in front of the feeding aperture, in which case the feeding aperture is closed, and away from the feeding aperture, in which case the feeding aperture is open, characterized in that a feed cover (108) has been arranged on the lower edge of the first wall, which feed cover is arranged to cover part of the feed (200), dispensed through the feeding aperture into the animal shelter, when the first wall is moved in front of the feeding aperture.

2. A feeding apparatus (100) according to claim 1, characterized in that the feed cover (108) is a flexible structure, preferably made of rubber.

3. A feeding apparatus (100) according to claim 1, characterized in that the feed cover (108) is a substantially stiff, panel-like structure.

4. A feeding apparatus (100) according to claim 1, characterized in that the free edge of the feed cover (108) is equipped with an edge reinforcement (116) to prevent animals from nibbling on the feed cover.

5. A feeding apparatus (100) according to claim 4, characterized in that the edge reinforcement (116) is a pipe or chain fastened onto the edge of the feed cover.

6. A feeding apparatus (100) according to claim 1, characterized in that it further comprises of a trough (102), placed inside the animal shelter (50) in connection with the feeding aperture (110), for the reception of the feed (200).

7. A feeding apparatus (100) according to claim 6, characterized in that a refrigeration system has been arranged in connection with the trough (102) to keep the feed (200) from becoming warm.

8. A feeding apparatus (100) according to claim 7, characterized in that said refrigeration system comprises cooling pipes (118) arranged onto the wall of the trough (102).

9. A feeding apparatus according to claim 1, characterized in that the first wall (104) comprises a net (114) covering substantially the area outlined by the edges of the feeding aperture (110).

10. A feeding apparatus according to claim 1, characterized in that the first wall (104) comprises a frame (105) substantially of the same size as the feeding aperture (110) and a net (114) fastened onto the frame and covering the area outlined by the frame.

11. A feeding apparatus (100) according to claim 10, characterized in that the first wall (104) is fastened from its upper edge close to the upper edge of the feeding aperture (110) using hinges (112).

12. A feeding apparatus (100) according to claim 11, characterized in that the second wall (106) is fastened onto the frame (105) of the first wall (104), or onto the structures surrounding the feeding aperture.

13. A feeding apparatus (100) according to claim 10, characterized in that the second wall (106) is fastened onto the frame (105) of the first wall (104), or onto the structures surrounding the feeding aperture.

14. A feeding apparatus (100) according to claim 10, characterized in that the second wall (106) is a curtain (128), preferably a pull curtain.

15. A feeding apparatus (100) according to claim 1, characterized in that the second wall (106) is a panel-like structure.

16. A feeding apparatus (100) according to claim 1, characterized in that the second wall (106) is constructed into a structure that is thermally insulating.

17. A feeding apparatus (100) according to claim 1 characterized in that the first and second walls (104, 106) are at least partially transparent.

18. A feeding apparatus (100) according to claim 1, characterized in that a support bar (120) rotating around its longitudinal axis has been arranged close to the upper edge of the feeding aperture (110), and the second wall (106) is a panel-like structure fastened from its upper edge to the support bar for opening and closing the second wall by way of rotating the support bar.

19. A feeding apparatus (100) according to claim 18, characterized in that the second wall (106) is constructed to open both inwards and outwards.

20. A feeding apparatus according to claim 18, characterized in that it further comprises a first actuator (122) for opening and closing the first wall (104), and/or a second actuator (124) for opening and closing the second wall (106), and a control device (126) for controlling the first and/or second actuator.

* * * * *